No. 726,855.
PATENTED MAY 5, 1903.
J. W. BROOKS.
WIRE REELING APPARATUS.
APPLICATION FILED OCT. 22, 1902.
NO MODEL.
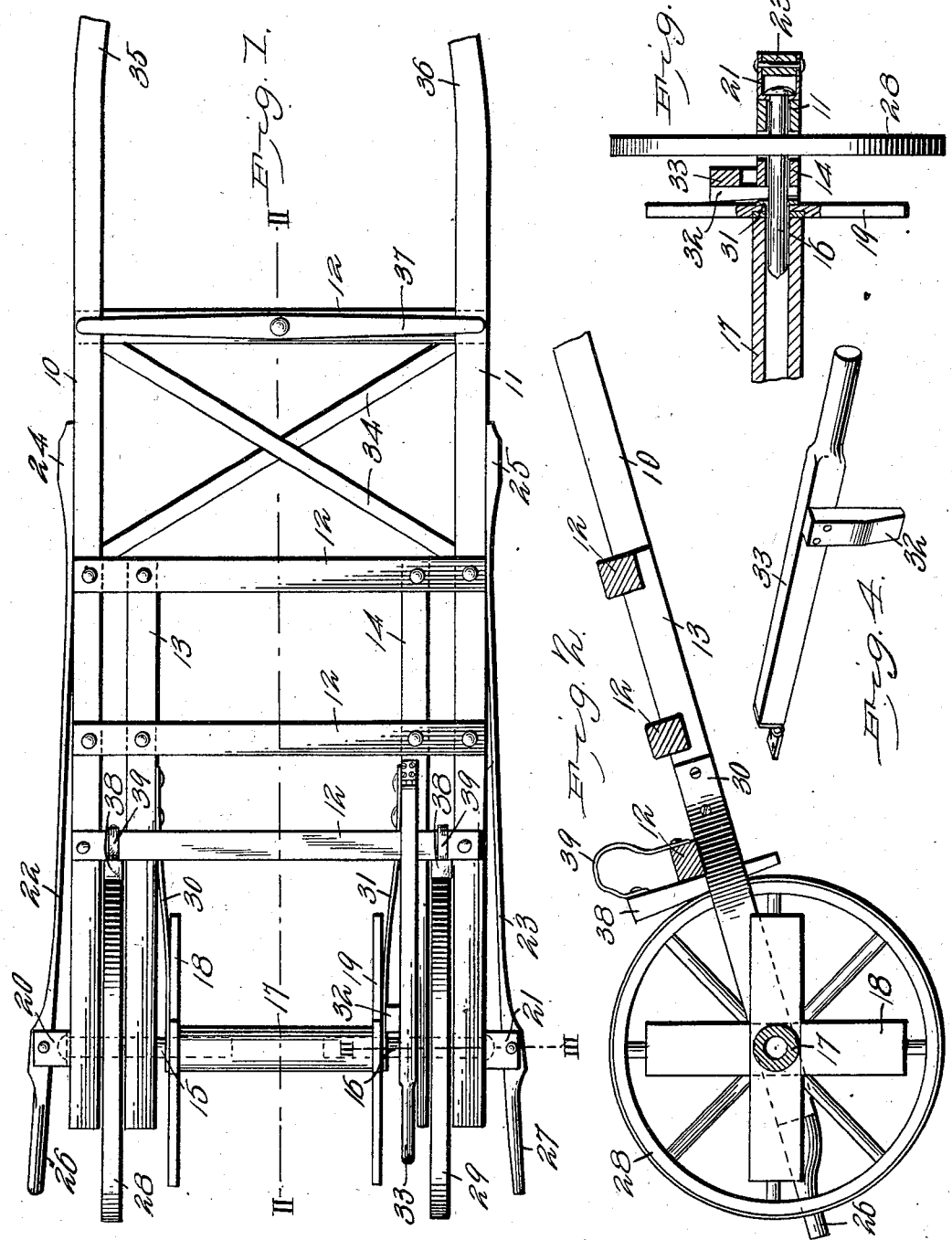

No. 726,855.

Patented May 5, 1903.

UNITED STATES PATENT OFFICE.

JESSE WATSON BROOKS, OF CHURCH HILL, TEXAS.

WIRE-REELING APPARATUS.

SPECIFICATION forming part of Letters Patent No. 726,855, dated May 5, 1903.

Application filed October 22, 1902. Serial No. 128,343. (No model.)

*To all whom it may concern:*

Be it known that I, JESSE WATSON BROOKS, a citizen of the United States, residing at Church Hill, in the county of Rusk and State of Texas, have invented a new and useful Wire-Reeling Apparatus, of which the following is a specification.

This invention relates to devices employed for handling the spools of wire in building fences, stringing telephone, telegraph, and other similar lines and which may be employed for stringing check-row wires and for similar purposes, and has for its object the production of a simply-constructed and easily operated and handled device for supporting the spools, so arranged that the spools may be readily and easily inserted and detached and its movements controlled.

The invention consists in certain novel features of construction and the arrangement of parts, as hereinafter shown and described, and specified in the claims.

In the drawings illustrative of the invention, Figure 1 is a plan view of the device complete. Fig. 2 is a longitudinal sectional elevation on the line II II of Fig. 1. Fig. 3 is a transverse section on the line III III of Fig. 1. Fig. 4 is a perspective view of the brake mechanism detached.

The improved device comprises a supporting-framework provided with oppositely-disposed axle members in longitudinal alinement transversely of the framework and movably connected to the framework, so that they can be moved longitudinally, and carrying the bearing-wheels by which the framework may be supported and also carrying the wire-spool rotatively by their adjacent ends, the axle members being movable longitudinally to enable the spool to be released. The supporting-framework consists of longitudinal side members 10 11, connected by transverse brace members 12, spaced apart and bolted or otherwise secured to the side members, as shown. Spaced from the side members 10 11 are shorter longitudinal members 13 14, connected to the transverse members 12, as shown. Movably mounted transversely of the side members 10 11 and the shorter members 13 14 are oppositely-disposed axle members 15 16, the axle member 15 engaging the spaced members 10 13 and the axle member 16 likewise engaging the members 11 14 and projecting inwardly from the members 13 14, so that portions of the axle members project inwardly toward each other from the longitudinal members 13 14 and afford supports for the spool for the wire, the latter consisting of the central core 17 and the end members 18 19 of the usual construction.

Connected to the outer ends of the axle members 15 16 are links 20 21, and connected to the outer ends of the links are levers 22 23, preferably formed of spring-bars and connected at 24 25 to the side members 10 11, the free ends of the spring-bars terminating in handles 26 27. The spring-bars 22 23 exert their force to normally maintain the axle members in their inward position in engagement with the spool, as shown in Fig. 1, but will yield to outward pressure to enable the axle members to be withdrawn from the spool, and thus release it. The same action will take place when a charged spool is to be inserted, the action of inserting the spool being very simple and easily accomplished, as will be obvious.

Rotatively mounted upon the axle members between the side members 10 11 and the shorter longitudinal members 13 14 are bearing-wheels 28 29, larger in diameter than the spool members 18 19, so that the latter will be carried free from the ground, as indicated in Fig. 2.

It will be noted that the axle members 15 16 will never be entirely withdrawn from engagement with the shorter frame members 13 14, and consequently will never be withdrawn from the wheels 28 29. By this means the bearing-wheels 28 29 will at all times be in operative position relative to the axle and framework and will not be affected by the longitudinal movement of the axle members.

The axle members are connected to the links 20 21, so as to be moved longitudinally thereby when the spring members 22 23, which engage the links, are operated, as above described. These axle members are preferably in the form of short-headed pintles, cylindrical in cross-section, inserted through perforations in the links to permit them to rotate independently of the latter; but it is to be understood that the axle members may be formed integral with the links, in which case rotation of the axles will be prevented owing to engagement of the spring members with the links.

Connected to the framework, preferably to the members 13 14, are tension-springs 30 31 in constant engagement by their free ends with the wire-spool to serve as yieldable brakes to the spool and prevent its too easy movement. The tension-springs may be of any suitable strength, so that they will exert the requisite force upon the spool, and may be of any size or strength required.

A brake means will be employed to coact with one or both of the tension-springs to increase or decrease the force of its engagement with the wire-spool, and thus control the movement of the latter.

For the purpose of braking the reel I employ a wedge member 32, connected to an operating-handle 33 and adapted to be inserted between the tension-spring 31 and the frame member 14, which action will compress the tension-springs more or less tightly against the spool, the wedge form of the member 32 enabling the pressure to be perfectly regulated, and thus easily control the pressure and retard the movement of the spool to any desired extent or to check it entirely, as may be desired. It will be obvious by this arrangement that the movement of the spool may be very easily and readily controlled by the operator.

The framework will preferably be provided with diagonal brace members 34 to increase its stability.

The side members 10 11 may be extended, as indicated at 35 36, to form thills or shafts to enable a horse to be connected to the framework, if desired; and to this end one of the members 12 will be provided with a singletree 37 of the ordinary construction to provide for the connecting of the horse with the apparatus.

The framework may be of any required size and of any suitable material, but will preferably be of wood and as light as possible to decrease its bulkiness to the largest extent consistent with the required strength and the strains to which it will be subjected. When employed with the thill or shaft extensions, a seat for the driver may also be added, if required.

One of the wedge brake members 32 33 may be attached to each of the tension-springs; but one only is shown as being sufficient to illustrate the invention, as the addition of another brake would not be a departure from the principle of the invention.

Under some circumstances it may be desirable to apply brakes to the draft-wheels 28 29—for instance, when running along a side hill—when it may be desirable to check the movement of one of the draft-wheels to prevent the device tilting over, and this may be readily done by inserting a wedge between the wheels 28 or 29, as the case may be, and the adjacent transverse member 12, as indicated at 38 in Fig. 2, this wedge member 38 being preferably supported when not in use by a flexible strap or other suitable support, (indicated at 39.)

This makes a very complete, easily-operated, and convenient device for the purposes above enumerated and may be employed for supporting the spools of fence-wire, either barbed or otherwise, telegraph or telephone wire, and may also be employed in stringing check-row wires and for other purposes in which wire is required to be unwound from reels or spools.

Having thus described the invention, what is claimed is—

1. In a device of the character described, a reel, a supporting-frame, oppositely-disposed axle members carried by said frame and rotatively supporting said reel, carrier-wheels mounted on the axles, and means for moving said axle members longitudinally independently of the wheels to release the reel.

2. In a device of the character described, the combination of a supporting-frame having spaced longitudinal bars arranged in pairs, axle members carried by the bars and disposed transversely thereof, carrier-wheels mounted on the axle members between the spaced bars, a reel rotatively supported by the axle members, and means for moving the axle members longitudinally independently of the wheels to release the reel.

3. In a device of the character described, the combination of a supporting-frame, oppositely-disposed axle members sustained by the frame, links engaging the outer ends of the axle members, carrier-wheels mounted for rotation on the axles, a reel rotatively supported by the axle members, and spring members engaging the links for moving the axle members longitudinally independently of the wheels to release the reel.

4. In a device of the character described, a reel, a supporting-frame, oppositely-disposed axle members carried by said frame and rotatively supporting said reel, oppositely-disposed links movably connected to said axle members, and spring-controlled lever-arms movably engaging said links, whereby said axle members are yieldably supported and adapted to be moved longitudinally to release said axle, substantially as described.

5. In a device of the character described, a framework provided with spaced longitudinal members, axle members disposed in longitudinal alinement transversely upon said spaced frame members, carrier-wheels engaging said axles between said spaced frame members, a reel carried by the adjacent ends of said axles, and spring-levers for longitudinally moving said axle members independently of said carrier-wheels to release said reel, substantially as described.

6. In a device of the character described, a supporting-frame consisting of spaced side members extended at one end into draft-thills, longitudinally-alined axle members transversely disposed upon the opposite ends of said side members, bearing-wheels engaging said axle members, a reel rotatively supported by said axle members, and means for longitudinally moving said axle members to release said reel, substantially as described.

In testimony that I claim the foregoing as my own I have hereto affixed my signature in the presence of two witnesses.

JESSE WATSON BROOKS.

Witnesses:
W. W. MOORE,
W. E. DE LAMAR.